US010259088B2

United States Patent

Bangma

(12) United States Patent

(10) Patent No.: US 10,259,088 B2

(45) Date of Patent: Apr. 16, 2019

(54) MINIMUM QUANTITY LUBRICATION SYSTEM WITH AIR BLOW OFF

(71) Applicant: UNIST, INC., Grand Rapids, MI (US)

(72) Inventor: Timothy John Bangma, Ada, MI (US)

(73) Assignee: Unist, Inc., Grand Rapids, MI (US)

( * ) Notice: Subject to any disclaimer, the term of this patent is extended or adjusted under 35 U.S.C. 154(b) by 148 days.

(21) Appl. No.: 15/255,183

(22) Filed: Sep. 2, 2016

(65) Prior Publication Data

US 2017/0066097 A1 Mar. 9, 2017

Related U.S. Application Data

(60) Provisional application No. 62/213,867, filed on Sep. 3, 2015.

(51) Int. Cl.

*B23Q 11/10* (2006.01)
*B05B 12/08* (2006.01)
*B05B 7/08* (2006.01)
*B05B 7/04* (2006.01)

(52) U.S. Cl.

CPC ........ *B23Q 11/1046* (2013.01); *B05B 7/0458* (2013.01); *B05B 7/0876* (2013.01); *B05B 7/0884* (2013.01); *B05B 12/085* (2013.01)

(58) Field of Classification Search

CPC . B23Q 11/1046; B05B 7/0884; B05B 7/0876; B05B 7/0458; B05B 12/085
USPC ............... 137/497, 486, 487; 239/412, 416.5
See application file for complete search history.

(56) References Cited

U.S. PATENT DOCUMENTS 3,888,420 A * 6/1975 Boelkins ................. B05B 12/00 184/7.4
4,687,138 A * 8/1987 Ostergaard ............. B08B 3/026 239/126
5,435,491 A * 7/1995 Sakuma ................ B05B 7/0815 239/296
5,524,729 A 6/1996 Boelkins
5,899,387 A * 5/1999 Haruch ................. B05B 7/0458 239/296
6,567,710 B1 5/2003 Boelkins
2008/0314314 A1* 12/2008 Erickson .................. B05B 7/02 118/302

FOREIGN PATENT DOCUMENTS

DE 10132857 A1 1/2003
DE 102006030651 A1 1/2007
EP 2416052 A2 2/2012

OTHER PUBLICATIONS

European Search Report for Counterpart EP16195209.8, dated Mar. 31, 2017.

* cited by examiner

*Primary Examiner* — Darren W Gorman
*Assistant Examiner* — Qingzhang Zhou
(74) *Attorney, Agent, or Firm* — McGarry Bair PC

(57) ABSTRACT

A MQL system having first and second air streams, with the first air stream comprising a mixture of atomized lubricant droplets entrained with an air stream having a first airflow and the second air stream comprising an air stream at a second airflow greater than the first airflow and sufficient to blow off cuttings from the tool/metal interface.

17 Claims, 4 Drawing Sheets

MINIMUM QUANTITY LUBRICATION SYSTEM WITH AIR BLOW OFF

CROSS-REFERENCE TO RELATED APPLICATIONS

This application claims priority to U.S. Provisional Patent Application No. 62/213,867, filed on Sep. 3, 2015, the entirety of which is incorporated herein by reference.

BACKGROUND OF THE INVENTION

Minimum quantity lubrication (MQL) is a metal cutting lubrication process that is much more environmentally friendly than the traditional approach of flood coolant. MQL uses a small amount of air and oil to lubricate the cutting process at the interface of the cutting tool and metal, instead of using massive amounts of coolant to quench the heat from the cutting process. One side effect of MQL is that the metal chips generated when cutting are not washed away and removed as they are with flood coolant. Having the chips removed is important because re-cutting them can damage the cutting tool and reduces its useful life.

To reduce the possibility of re-cutting the chips with MQL, an Air Blow Off (ABO) is sometimes used. The ABO uses a stream of air to remove the chips instead of a stream of coolant or other liquid. For MQL, where atomized particles of lubricant are carried in an air stream, the amount of air required to remove chips is often several times more than is necessary to propel the lubricant to the part. For MQL, using too much air with the lubricant leads to a fogging of the lubricant, which is annoying to operators, undesirable for air quality, and wasteful of the lubricant. On the other hand, using too little air for the ABO is ineffective in removing chips. Thus, the MQL and ABO air stream requirements are incompatible. So the current approach is to use separate nozzles for each function. A typical MQL applicator has an MQL fluid output nozzle and a separate ABO nozzle.

While on some machine tools the separate nozzles are not an issue, on CNC machines where tool changers are active and the parts or tables may be moving, it is difficult to place external nozzles in locations that do not interfere with the machine movements, yet are still positioned appropriately to perform the lubrication and blow off functions. The invention provides a solution to the problem of using a single nozzle in an MQL system that performs both the MQL and ABO functions.

SUMMARY OF THE INVENTION

In a first aspect, the disclosure relates to a nozzle for a minimum quantity lubrication (MQL) system including a nozzle housing defining a nozzle tip, a lubricant supply passage extending through the housing and exiting the nozzle and an air supply passage having a first branch fluidly coupling to the lubricant supply passage upstream of the nozzle tip and a second branch fluidly separate from the lubricant supply passage and fluidly coupling with the nozzle tip. A valve selectively fluidly couples the first branch to the lubricant supply passage, wherein the pressure of the air supplied to the air supply passage actuates the valve to control the supply of air to the first branch.

In another aspect, the disclosure relates to a MQL system for supplying a lubricant to a tool, including at least one air supply line selectively supplying a supply of air at one of a first pressure or a second pressure. The MQL system further includes a lubricant supply line supplying a supply of lubricant. A nozzle includes a nozzle housing defining a nozzle tip, a lubricant supply passage extending through the housing and exiting the nozzle tip, an air supply passage having a first branch and a second branch, and a valve selectively fluidly coupling the first branch to the lubricant supply passage. The first pressure is insufficient to close the valve, permitting the first air supply to pass through the crossover conduit to mix with the supply of lubricant in the lubricant conduit. The second pressure is sufficient to close the valve in order to prevent passing of the second air supply to the lubricant conduit and to exhaust the second air supply from the nozzle through the air conduit.

In yet another aspect, the disclosure relates to a method of supplying MQL to a tool from a nozzle including: (1) supplying airflow lubricant to the nozzle; (2) supplying air at a first pressure to a valve to fluidly couple at least a portion of the air with the lubricant to form an atomized lubricant air stream; (3) supplying air at a second pressure to the valve, greater than the first pressure, to fluidly uncouple the at least a portion of the air with the lubricant to form a blow off air stream; and (4) actuating a valve within the nozzle with the supply of the first or second airflow. Actuation of the valve can selectively provide a mixture of lubricant and the first airflow, or the second airflow alone, to the tool.

DESCRIPTION OF EMBODIMENTS OF THE INVENTION

As an overview, embodiments of the invention provide for a single nozzle to provide both the atomized lubricant of the minimum quantity lubrication (MQL) system and the blow off air from the air blow off (ABO) system without creating a fog or cloud of mist in the transition. This can be accomplished by ceasing the supply of air and lubricant in the first air stream and increasing the flow rate of the second air stream, while simultaneously breaking the premixing coupling between the fluid delivery and air delivery systems. This premix coupling is done in the nozzle during the MQL mode to maintain a constant output given the intermittent fluid input from the pump. The airflow of the second airstream can be selected to blow off the cuttings expected from the machining operation.

Figure 1:
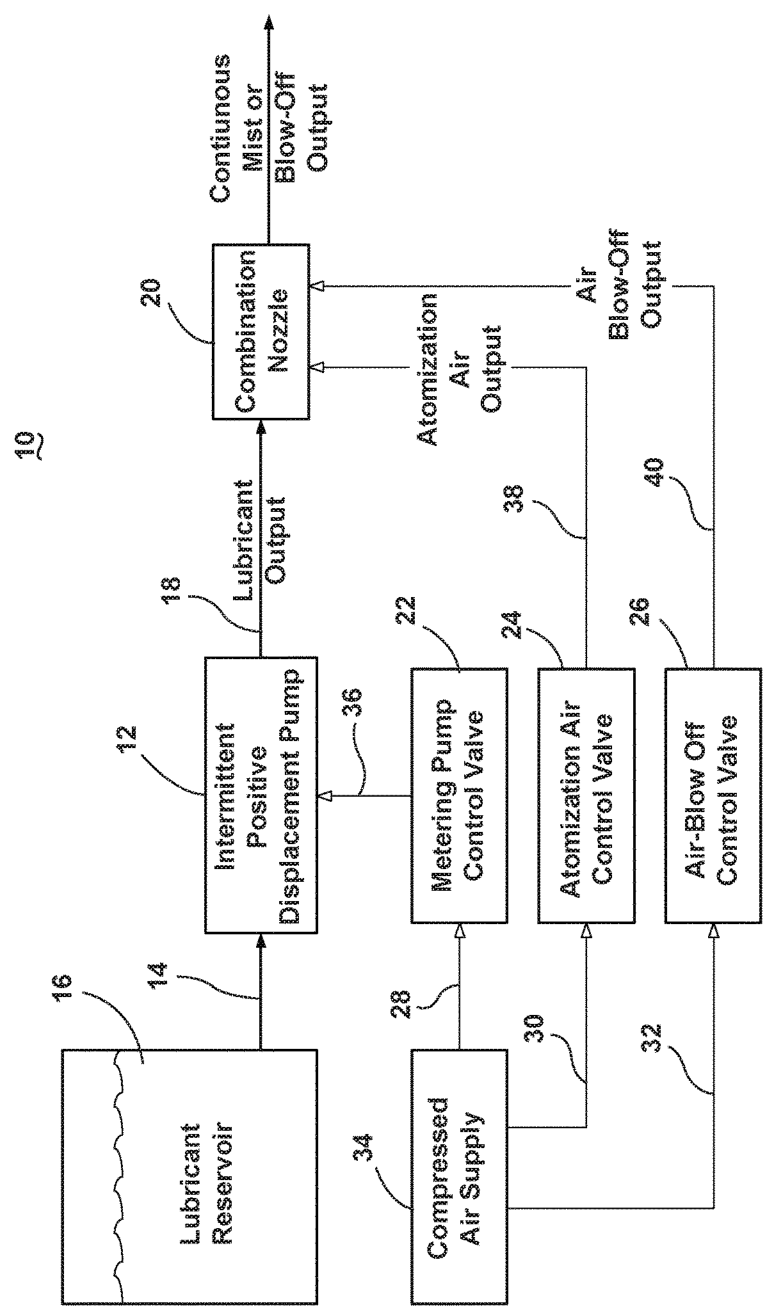
FIG. 1 is a schematic illustration of a MQL system in combination with an ABO system and both utilizing a combination nozzle according to a first embodiment of the invention.

FIG. 1 schematically illustrates a MQL system 10 according to a first embodiment of the invention. The MQL system 10 includes a pump 12, such as an intermittent positive displacement pump, having an input line 14 fluidly coupled to a lubricant reservoir 16 and a pump output line 18 fluidly coupled to a combination nozzle 20. In the configuration, the pump 12 draws lubricant from the reservoir 16 through the input line 14 and supplies the lubricant through the pump output line 18 to the combination nozzle 20.

The MQL system 10 further includes a series of control valves including metering pump control valve 22, atomization air control valve 24, and an air blow off control valve 26. The valves 22, 24, 26 each have a corresponding input line 28, 30, 32, which is fluidly coupled to a compressed air supply 34. The metering pump control valve 22 has an output line 36 fluidly coupled to the pump 12, with the compressed air being used to control the actuation of the pump 12. That is the ON/OFF supply of air through the metering pump control valve 22 controls the ON/OFF supply of lubricant from the pump 12. Examples of the operation and control of positive displacement pumps can generally be found in U.S. Pat. No. 3,888,420, U.S. Pat. No. 5,524,729, and U.S. Pat. No. 6,567,710, which are incorporated herein by reference in their entirety.

The atomization air control valve 24 has an output line 38 that is fluidly coupled to the combination nozzle 20. The atomization air control valve 24 supplies a first stream of pressurized air at a first flow rate to the combination nozzle 20 such that the first air stream is mixed with the lubricant supplied by the pump 12 to form a mixture of atomized lubricant and air, which is then emitted from the combination nozzle 20.

The air blow off control valve 26 has an output line 40 fluidly coupled to the combination nozzle 20. The air blow off control valve 26 supplies a second air stream of pressurized air at a second flow rate to the combination nozzle 20 such that the second air stream exerts at a great enough force to remove any cuttings around a tool/metal interface. The second flow rate is greater than the first flow rate. The second flow rate can be selected for the anticipated size and weight of cuttings for the given tool/metal application.

In an overview of the operation, during the cutting operation when the tool is cutting the metal and forming cuttings for removal, the MQL system 10 will selectively supply the first and second air streams to the tool/metal interface. The first air stream is supplied to lubricate the tool during the cutting. The second air stream is supplied to remove the cuttings by blowing off the cuttings from the tool/metal interface.

With the general structure and operation now being understood, reference is made to FIG. 2 where a specific example of a combination nozzle 20 will be described in detail. The combination nozzle 20 includes a housing 50 to define a nozzle tip 51 having an inlet port 52 and an outlet port 54. The inlet port 52 comprises coaxial conduit 56, as a lubricant supply passage extending through the housing and exiting the nozzle tip 51, that fluidly couples to the pump output line 18, and coaxial conduit 58, which fluidly couples the atomization air control valve output line 38 and air blow off control valve control line 40. The coaxial conduit 58 can be an air supply passage having a first branch 59 and a second branch 61. The first branch 59 can include the output line 38, the pneumatic sensor conduit 94, the crossover port 74, and the coaxial conduit 60. The second branch 61 can include the output line 38 and the coaxial conduit 62. The first branch 59 couples the lubricant supply passages or the coaxial conduit 56 to the coaxial conduit 58 upstream of the nozzle tip 51. The second branch 61 is fluidly separate from the lubricant supply passage and the coaxial conduit 56 and is fluidly coupled with the nozzle tip 51. The outlet port 54 comprises coaxial conduits 60, 62 that output the first and second airstreams.

A lubricant plenum 64 has a plenum inlet 66 and a plenum outlet 68. The plenum inlet 66 is fluidly coupled to the coaxial conduit 56 and the coaxial conduit 60. Thus, lubricant supplied to the lubricant plenum 64 from the coaxial conduit 56 can flow through the plenum outlet 68 to the coaxial conduit 60.

The atomization air path that is used for the purposes of output leveling is formed in the housing 50 by a first air plenum 70 and crossover ports 72, 74, which are fluidly coupled to each other by a crossover plenum 76 including a valve seat, and the coaxial conduit 58 and the plenum outlet 68. When the first air stream passes through the coaxial conduit 58, the first air stream will pass through the atomization air path to the plenum outlet 68 where the first air stream mixes with the lubricant exiting the plenum outlet 68 to form the atomized mixture, which is then dispensed through the coaxial conduit 60 and further mixed with the an airstream dispensed through coaxial conduit 62 by means of a second air plenum 80.

The air path used for the air blow off and for additional atomization at the nozzle tip 51 is formed in the housing 50 by a second air plenum 80 that fluidly couples the coaxial conduit 58 to the coaxial conduit 62. The second air plenum 80 fluidly bypasses the lubricant plenum 64 such that when the second air stream is supplied to the coaxial conduit 58, the second air stream bypasses the lubricant plenum 64 and no lubricant is supplied to the second air stream.

A valve, such as a pressure-actuated valve in one non-limiting example, including a pneumatic sensor, is illustrated in the form of a plunger 86 and a spring 88 is provided to switch the combination nozzle 20 from emitting the first air stream or the second air stream in response to the selective operation of the atomization air control valve 24 and the air blow off valve 26. The pressure-actuated valve can be a spring-biased plunger, in one non-limiting example. The valve selectively fluidly couples the first branch 59 to the lubricant supply passage, wherein the pressure of the air supplied to the air supply passage actuates the valve to control the supply of air to the first branch 59. The pressure actuated valve can be adapted to actuate only at a threshold pressure. The plunger 86 is located in the housing 50 such that it can axially move between a first position (FIG. 3), where the crossover ports 72, 74 are fluidly coupled to each other, and a second position (FIG. 4), wherein the plunger 86 stops fluid flow between the crossover ports 72, 74. To enable a fluidly sealing of the crossover ports 72, 74, a seal 90 is located within the crossover plenum 76, and an axial end 92 of the plunger 86 is sized so as to extend into the crossover plenum 76 and seal against the seal 90 to fluidly seal the crossover ports 72, 74 from each other.

To enable the plunger 86 to move from the first position to the second position in response to the selective operation of the atomization air control valve 24 and the air blow off valve 26, a pneumatic sensor conduit 94 fluidly couples the coaxial conduit 58 to the plunger 86 and the spring 88 is sized so as to apply a force to the plunger that is great enough to resist movement of the plunger when the first air stream is supplied to the combination nozzle 20, but weak enough to permit movement of the plunger when the second air stream is supplied to the combination nozzle. Thus, when the second air stream is supplied via actuation of the air blow off valve, the greater pressure of the second air stream overcomes the force of the spring 88 and moves the plunger from the first to the second position.

Figure 3:
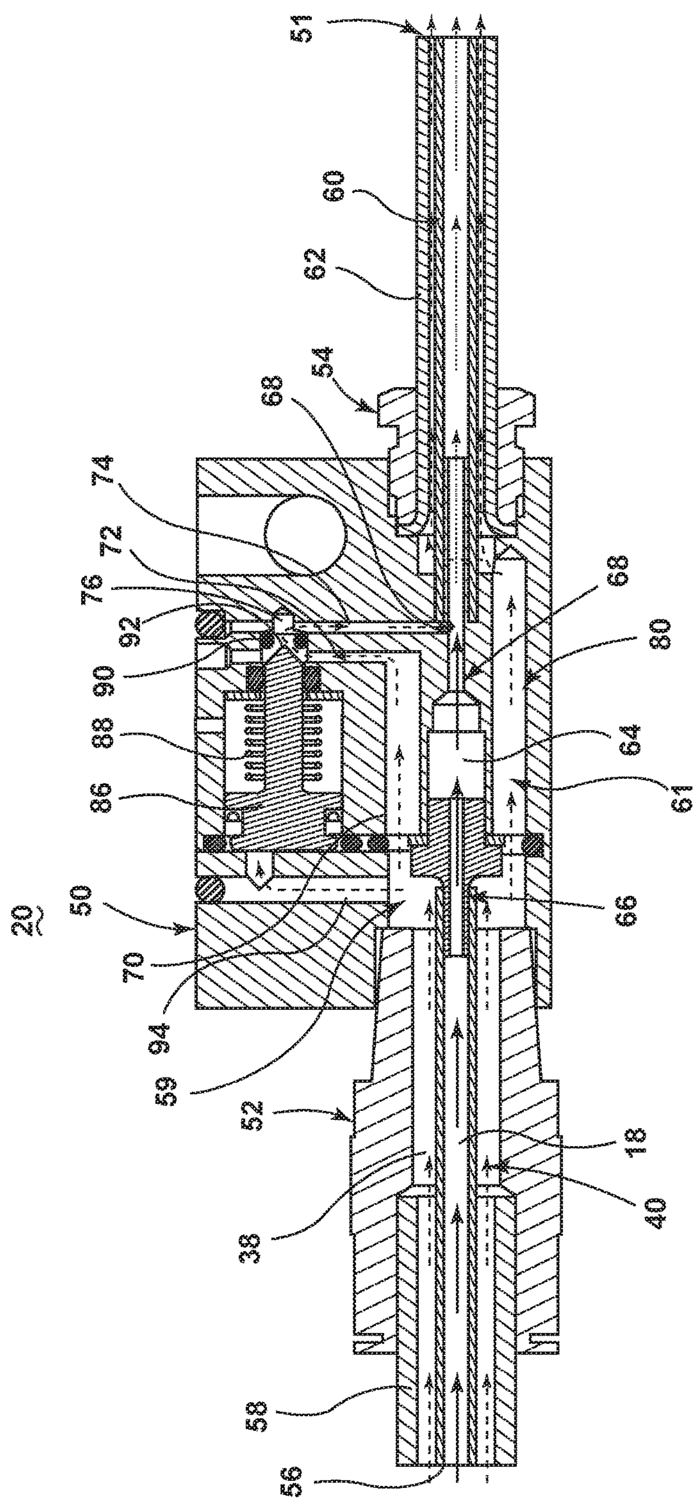
FIG. 3 illustrates the combination nozzle of FIG. 2 in a lubricating configuration.

The operation of the combination nozzle will now be described with reference to FIGS. 3 and 4. FIG. 3 illustrates the combination nozzle 20 when the atomization air control valve 24 is on or open, and the air blow off control valve 26 is off or closed, such that the first air stream is being supplied to the coaxial conduit 58. The airflow supplied by the atomization air control valve 24 is of a pressure that is insufficient to move the plunger from the first to the second position, resulting in the generation of the first air stream flowing through the atomizing air path, illustrated by the arrows, to the plenum outlet 68, wherein the atomization air output 38 mixes with and atomizes the lubricant and carries the atomized lubricant through the coaxial conduit 60 to the tool/metal interface. In this operational condition, the metering pump control valve 22 is on and the pump is supplying lubricant, at least intermittently, to the lubricant plenum 64 through the coaxial conduit 56. During the supply of the first air stream, air also passes through the coaxial conduit 62 as well as 60. Air will always pass through the coaxial conduit 62 during provision of a supply of air to the nozzle 20.

Figure 4:
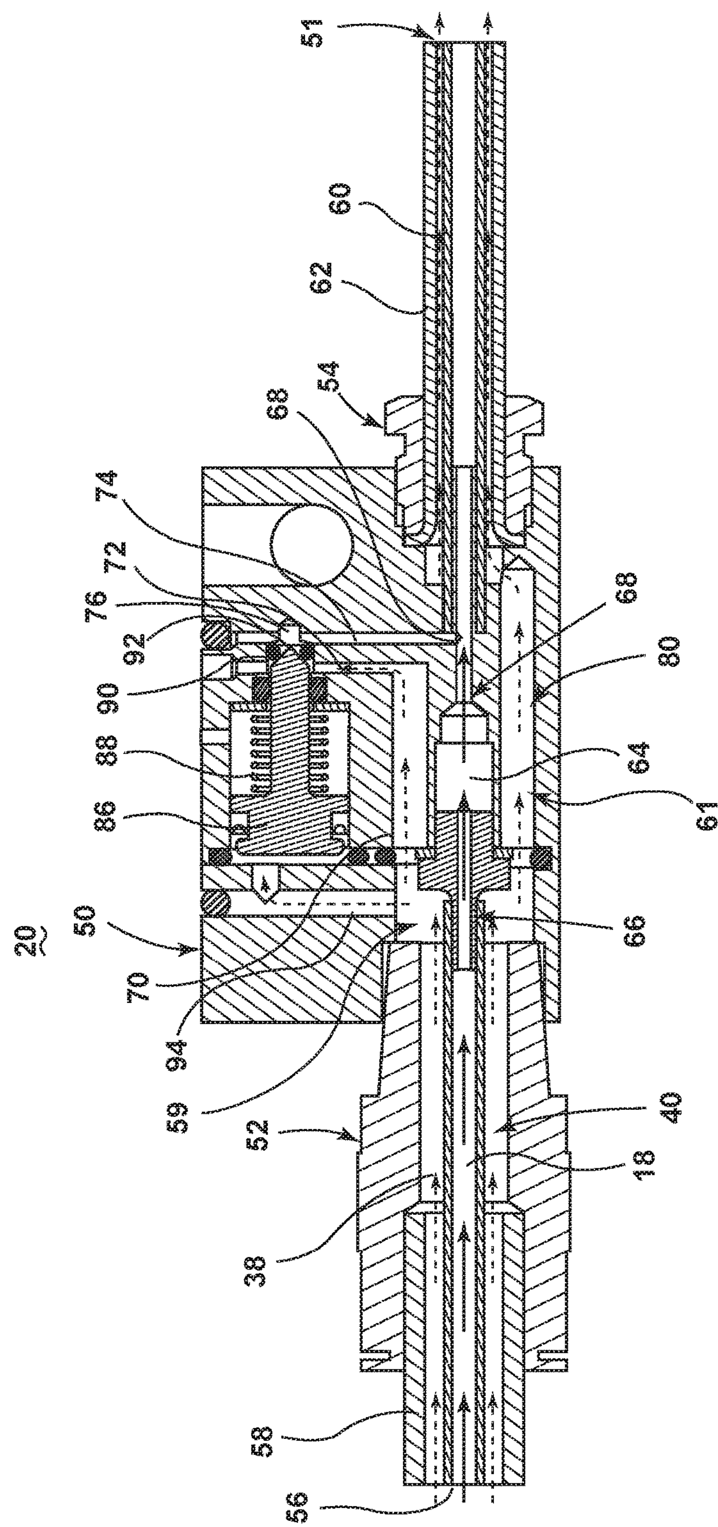
FIG. 4 illustrates the combination nozzle of FIG. 2 in an air blow off configuration.

FIG. 4 illustrates the combination nozzle 20 when the atomization air control valve 24 is off or closed, and the air blow off control valve 26 is on or open, such that the second air stream is being supplied to the coaxial conduit 58. The second air stream is of a great enough flow that it moves the plunger 86, against the force of the spring 88, from the first position to the second position such that the axial end 92 of the plunger seals against the seal 90 and closes off fluid flow through the crossover ports 72, 74 to prevent the flow of air to the plenum outlet 68 and prevent the mixing of second air stream with the lubricant. Instead, the second air stream flows through the blow off air path, illustrated by the arrows, from the coaxial conduit 58 to the coaxial conduit 62, such that blow off air is supplied through the coaxial conduit 62 to the tool/metal interface.

When the combination nozzle 20 is operated in the blow off configuration, there is normally no need to supply lubricant to the plenum outlet 68. Thus, the metering pump control valve 22 can be turned off to shut off the pump 12. However, if there were a reason to continue the supply of lubricant, the metering pump control valve 22 could be left on to continue the supply of the lubricant.

While the pneumatic sensor is illustrated as a plunger and spring, other configurations are possible. Indeed, it is possible to use other types of sensors or structures to control the switching between the first and second air streams to switch between lubricating air stream and blow off air stream.

The combination nozzle 20 can be controlled with the system of FIG. 1, to provide a method of supplying MQL to a tool from a nozzle can include: (1) supplying one of a first airflow or a second airflow to the nozzle; (2) supplying a lubricant to the nozzle during supplying of the first airflow; and (3) actuating a valve within the nozzle with the supply of the first or second airflow. Actuation of the valve can selectively provide a mixture of lubricant and the first airflow, or the second airflow alone, to the tool. Selectively supplying the first or second airflow can include, for example, supplying a volume of air to the nozzle from either the atomization air output 38 or the air blow-off output 40 of FIG. 1. It is contemplated that the supply of air can be supplied simultaneously down both of the conduits 60, 62.

Supplying the lubricant to the nozzle can include using the positive displacement pump 12 of FIG. 1, for example, or any suitable means, to the nozzle 20. Supplying of the lubricant can be selectively operated, such as by the metering pump control valve 22. In one example, the supply of lubricant can only be provided during supply of the atomization air output 38 in order to provide an atomized flow of lubricant and air, such as a mist, to lubricate the tool. Alternatively, the positive displacement pump 12 can be turned off by the valve 22 during air blow-off output 40 when it is desirable to blow off particulate matter from the tool during machining operations.

Figure 2:
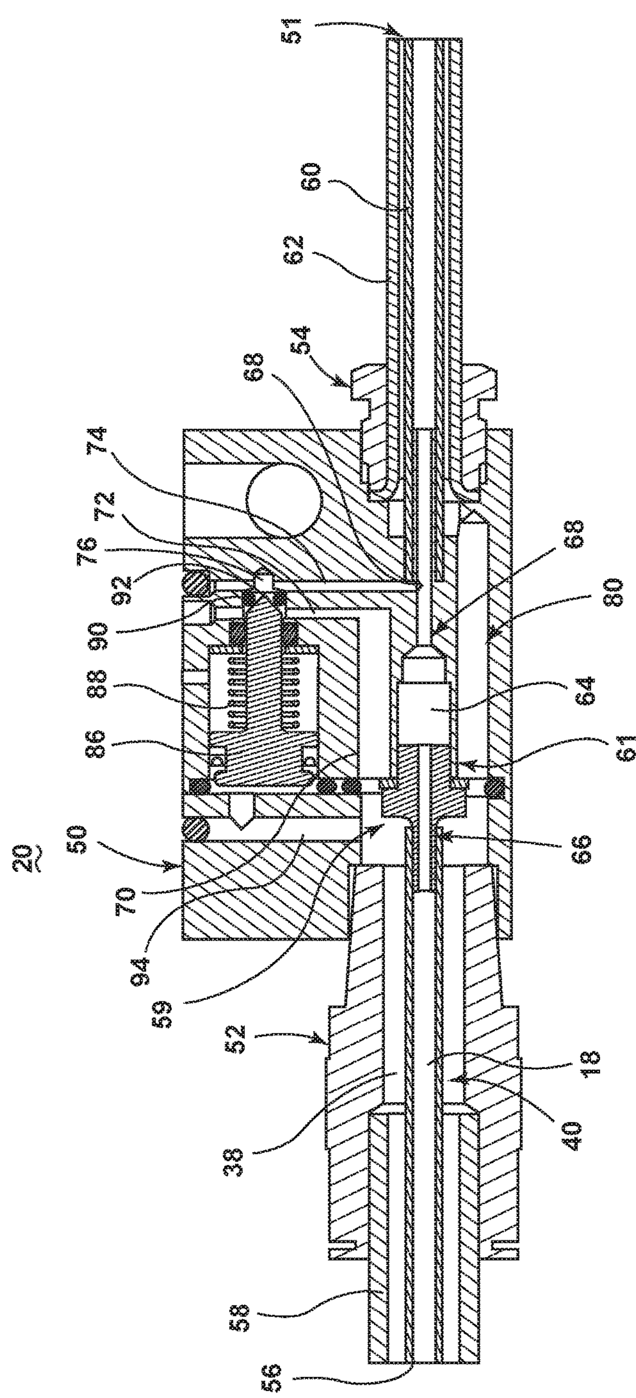
FIG. 2 is a cross-sectional view of the combination nozzle of FIG. 1.

The valve, such as the spring-and-plunger valve of FIG. 2, can actuate within the nozzle 2 between an opened and closed position based upon the supply of the atomization air output 38 or the air blow-off output 40. The atomization air output 38 can be supplied during lubrication operations, positioning the valve in the opened position, and the air blow-off output 40 can be supplied to close the valve for blowing air to the tool. Actuation of the valve can be a function of a supplied air pressure, or can be actuated at a threshold pressure, in non-limiting examples.

As such, actuation of the valve based upon the provision of the different airflows can be used to passively open or close the valve in the nozzle to selectively provide lubrication or blow-off air at the tool during machining operations. Thus, it should be appreciated that during machining, sufficient lubricant can be supplied to the tool, and in between machining, the blow-off air can remove residual particular matter, such as metal shavings, in order to minimize any defections which might otherwise be caused by the interfering residual particulate matter.

It should be appreciated that the system provides for an integrated blow off output with an atomized lubricant nozzle. The system provides for selectively providing an atomized lubricant supply for lubricating a tooling machine or providing a pressurized air supply, at a separate pressure, to the tooled machine to blow off remaining particulate matter, such as metal shavings.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A nozzle for a minimum quantity lubrication (MQL) system comprising:

- a nozzle housing defining a nozzle tip;
- a lubricant supply passage extending through the nozzle housing and exiting the nozzle tip;
- an air supply passage having a first branch including a crossover conduit with a valve seat fluidly coupled to the lubricant supply passage to the air supply passage upstream of the nozzle tip, and a second branch fluidly separate from the lubricant supply passage and fluidly coupled with the nozzle tip;
- a lubricant plenum in fluid communication with the lubricant supply passage and disposed upstream of an intersection of the crossover conduit and the air supply passage; and
- a valve selectively fluidly coupling the first branch to the lubricant supply passage wherein actuation of the valve can selectively open and close the crossover conduit.

2. The nozzle of claim 1 wherein the second branch is always fluidly coupled to the nozzle tip.

3. The nozzle of claim 1 wherein the valve is a pressure-actuated valve having a spring-biased plunger valve actuated by the pressure of a supply of air to the first branch.

4. The nozzle of claim 3 wherein the pressure of the air supplied to the air supply passage can actuate the spring-biased plunger valve.

5. The nozzle of claim 1 wherein at least a portion of the lubricant supply passage and the air supply passage are co-axial.

6. The nozzle of claim 5 wherein the second branch is coaxial with the lubricant supply passage at the nozzle tip.

7. The nozzle of claim 1 further comprising a sensor conduit fluidly coupling the air supply passage to the valve.

8. The nozzle of claim 1 wherein the second branch includes an air plenum bypassing the valve.

9. The nozzle of claim 1 wherein the valve is adapted to actuate at a threshold.

10. A minimum quantity lubrication (MQL) system for supplying a lubricant to a tool, the MQL system comprising:

at least one air supply line selectively supplying a supply of air at one of a first pressure or a second pressure;

a lubricant supply line supplying a supply of lubricant;

a nozzle comprising:

a nozzle housing defining a nozzle tip;

a lubricant supply passage extending through the nozzle housing and exiting the nozzle tip;

an air supply passage having a first branch fluidly coupled to the lubricant supply passage upstream of the nozzle tip and a second branch fluidly separate from the lubricant supply passage and fluidly coupled with the nozzle tip; and a valve selectively fluidly coupling the first branch to the lubricant supply passage;

a positive displacement pump fluidly coupled to the lubricant supply line for providing the supply of lubricant to the nozzle; and a metering pump control valve communicatively coupled to the positive displacement pump at the at least one air supply line to operate the positive displacement pump based upon the supply of the first or second pressure;

wherein the first pressure is insufficient to close the valve, permitting the supply of air to pass through the first branch and mix with the supply of lubricant in the lubricant supply passage; and wherein the second pressure is sufficient to close the valve to provide the supply of air solely through the second branch of the nozzle.

11. The MQL system of claim 10 wherein the first pressure is less than the second pressure.

12. The nozzle of claim 10 wherein the valve is a pressure-actuated valve having a spring-biased plunger valve actuated by the pressure of the supply of air to the first branch.

13. The nozzle of claim 12 wherein the pressure of the air supplied to the air supply passage can actuate the spring-biased plunger valve.

14. The nozzle of claim 10 wherein at least a portion of the lubricant supply passage and the second branch of the air supply passage are co-axial.

15. The nozzle of claim 14 wherein the second branch is coaxial with the lubricant supply passage at the nozzle tip.

16. The nozzle of claim 10 further comprising a sensor conduit fluidly coupling the air supply passage to the valve.

17. The nozzle of claim 10 wherein the valve is adapted to actuate at a threshold.

* * * * *